UNITED STATES PATENT OFFICE.

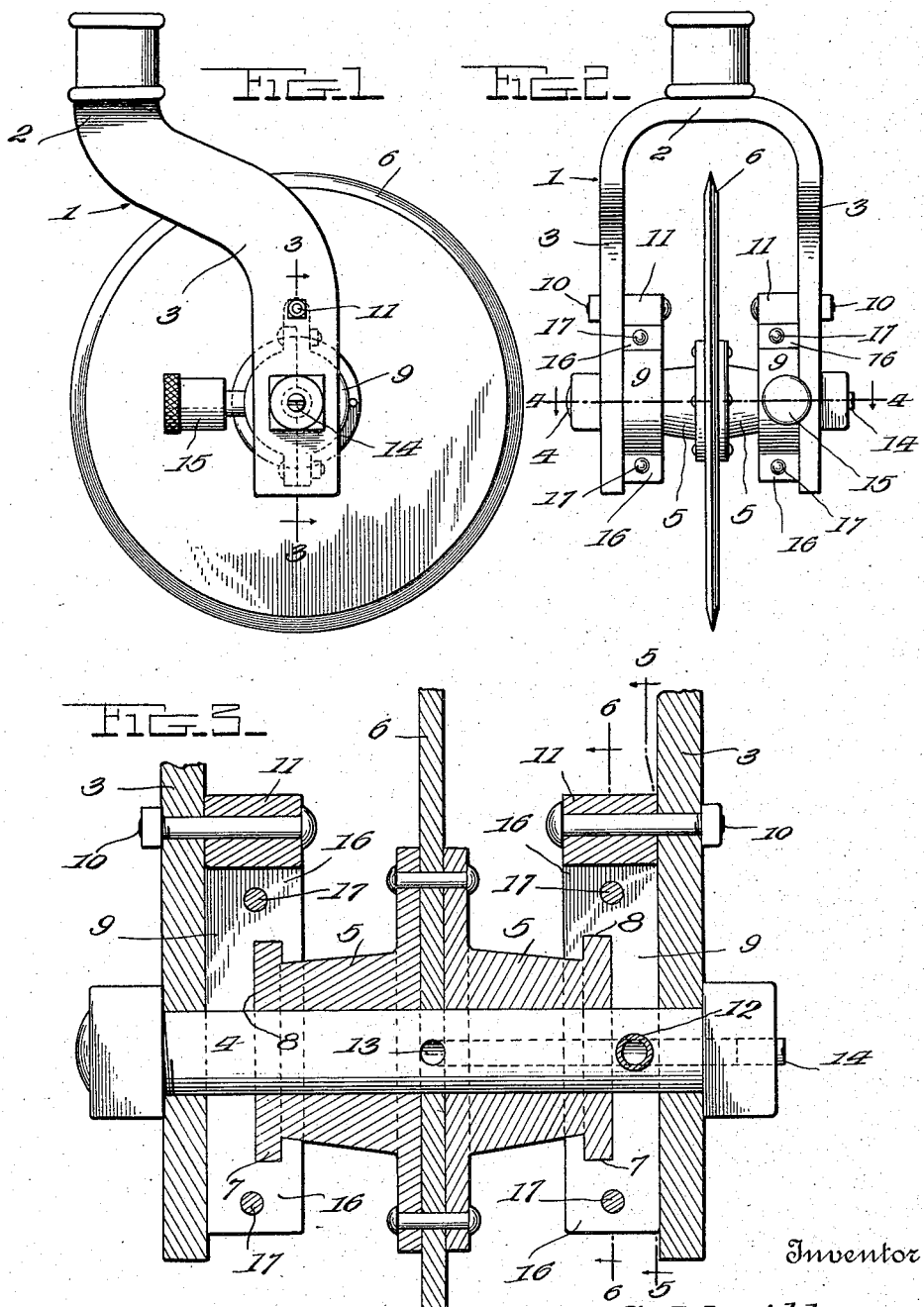

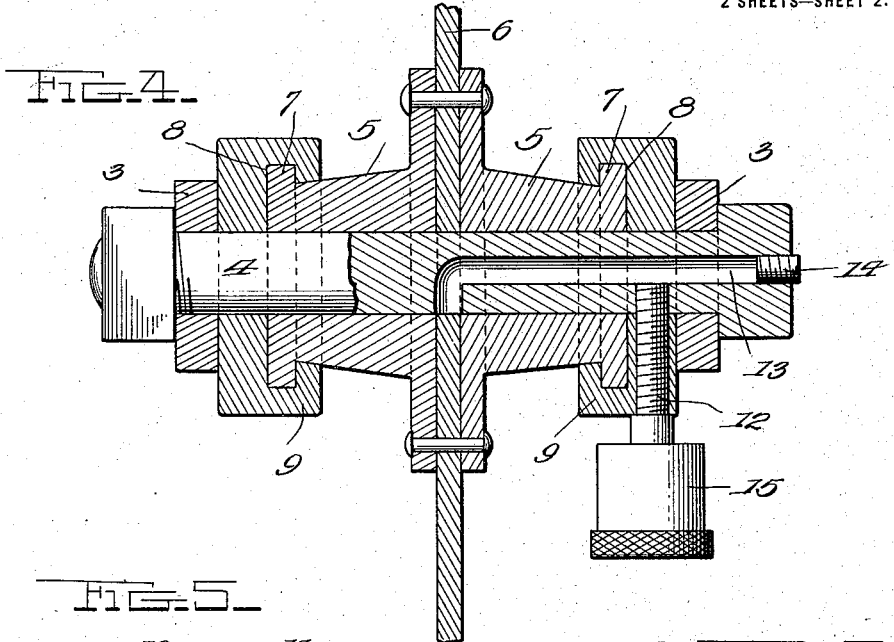
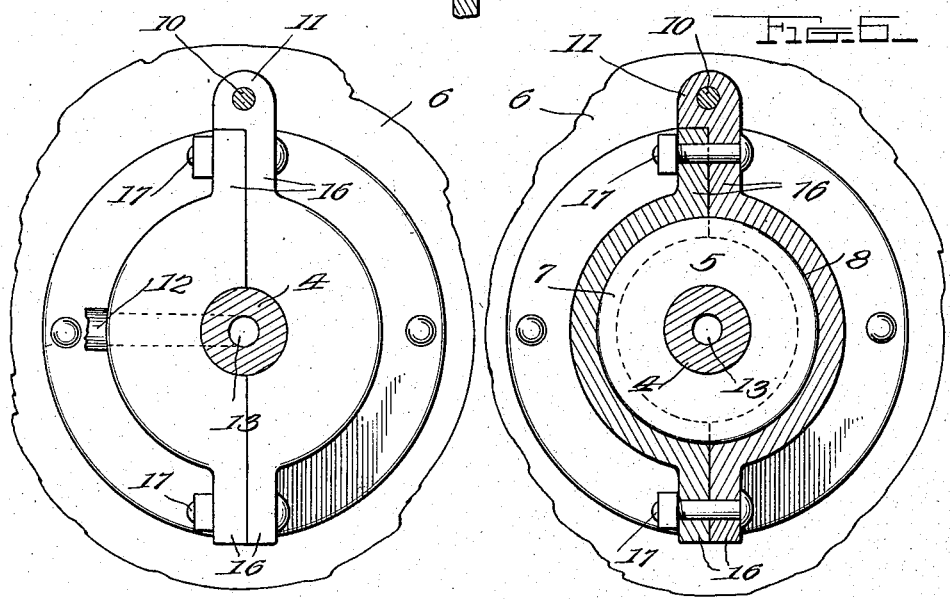

STANLEY P. MILLER, OF MINTO, NORTH DAKOTA.

LUBRICATING MEANS FOR DISK COLTERS.

1,170,771.  Specification of Letters Patent.  Patented Feb. 8, 1916.

Application filed May 24, 1915. Serial No. 30,083.

*To all whom it may concern:*

Be it known that I, STANLEY P. MILLER, a citizen of the United States, residing at Minto, in the county of Walsh and State of North Dakota, have invented certain new and useful Improvements in Lubricating Means for Disk Colters; and I do declare the following to be a full, clear, and exact description of the invention, such as will enable others skilled in the art to which it appertains to make and use the same.

My invention relates broadly to improvements in lubricating devices, and more particularly to those designed primarily for lubricating the shafts and hubs of disk colters, the latter being adapted for attachment to plows for initially breaking the earth before the same is turned by the mold board.

The object of the invention is to provide means of the class described which although being of extremely simple construction, will be highly efficient in operation, provision being made whereby dust and dirt is prevented from entering between the several bearing surfaces.

With this general object in view, the invention resides in certain novel features of construction and in unique combinations of parts hereinafter fully described and claimed.

In describing the invention, I shall refer to the accompanying drawing wherein like reference characters designate corresponding parts throughout the several views and wherein:

Figure 1 is a side elevation of a colter equipped with the lubricating means; Fig. 2 is a front elevation of the parts shown in Fig. 1; Fig. 3 is a vertical section as seen along the plane indicated by the line 3—3 of Fig. 1; Fig. 4 is a horizontal section taken on the plane designated by the line 4—4 of Fig. 2; Figs. 5 and 6 are detail vertical sections taken respectively on the planes indicated by the lines 5—5 and 6—6 of Fig. 3.

In this drawing which constitutes a part of the application, the numeral 1 designates an upright fork whose crown 2 may be secured by any preferred means to the beam of a plow or to any other type of agricultural implement, the arms 3 of said fork being disposed in parallel relation and terminating a suitable distance above the ground level, said arms being provided with horizontally alined openings near their lower ends receiving therein a horizontal shaft 4 here shown in the form of a bolt upon which a pair of hubs 5 are rotatably mounted, said hubs being provided at their inner ends with flanges or the like which are rigidly secured to the colter disk 6, while at their outer ends they are equipped with additional annular flanges 7 surrounding said ends as clearly shown in Figs. 3 and 6.

The flanges 7 are spaced inwardly from the inner sides of the arms 3 and are received by annular internal grooves 8 formed in two-part dust caps 9, the inner sides of these caps being formed in two diameters, the larger of which contact closely with the outer ends of the hubs 5, while the smaller diameters snugly surround the ends of the shaft 4 between said hubs 5 are the arms 3. With the dust caps 9 disposed in this manner, bolts 10 are passed through the arms 3 and through lugs 11 with which said dust caps 9 are provided, whereby the same are held against rotation.

Threaded through one of the dust caps 9 and into a threaded aperture formed in one side of the bolt 4, is a tube 12, the inner end of which delivers into a port 13 formed centrally and longitudinally throughout approximately one-half the length of the shaft 4, the inner end of said port being extended laterally and delivering through the curved outer side of the shaft 4 at the center thereof, while the outer end of the port is closed by a screw plug 14 which may be removed for cleaning said port when necessary. The outer end of the tube 12 communicates with the interior of a grease cup 15 whereby grease deposited in this cup may be fed through the tube 12 and port 13 onto the curved side of the shaft 4, thus causing the hub members 5 to readily rotate thereon, the contacting parts of said hub members and the shaft being now shielded against dust, dirt, grit and the like, by the dust caps 9.

Although the caps 9 may be of practically any preferred construction, they are each preferably formed of a pair of semi-circular sections having abutting laterally extending ears 16 through which bolts 17 are passed, thus securing said caps removably around the ends of the shaft 4. It is upon one of the ears 16 of each of the dust caps 9 that the lugs 11 are provided as clearly disclosed in Fig. 5.

From the foregoing description, taken in connection with the accompanying drawing, it will be evident that although very simple and comparatively inexpensive construction has been provided for carrying out the object of the invention, the latter will be very efficient in operation and will effectively lubricate the shaft and hub of the colter, the effect of such lubrication being increased by the provision of the dust caps 11.

I am aware that the broad use of dust caps for purposes similar to that set forth above, is not new, but I do not claim such broad use as my invention, the features deemed novel by me being set forth in the following.

I claim:

1. In combination, a pair of spaced arms for attachment to a plow or the like, a shaft spanning the space between said arms, a hub rotatably mounted on said shaft and having its ends spaced from the arms, and a pair of dust caps having inner sides of two diameters, the smaller diameters being disposed around the shaft between the hub and the arms, and the larger diameters receiving therein the opposite ends of the hub.

2. In combination, a pair of spaced arms, for attachment to a plow or the like, a shaft spanning the space between the two arms, a hub member rotatably mounted on said shaft and having its ends spaced from the arms, and a pair of dust caps secured to the arms and having bores of two diameters, the smaller diameters being disposed around the shaft between the arms and the hub and the larger diameters receiving therein the opposite ends of the hub.

3. In combination, a pair of spaced arms, for attachment to a plow or the like, a shaft spanning the space between the two arms, a hub rotatably mounted on said shaft and having its ends spaced from the arms, and cap members surrounding said ends of the hub and the portions of the shaft between the same and the arms.

4. In combination, a pair of spaced arms for attachment to a plow or the like, a shaft spanning the space between the two arms, a hub rotatably mounted on said shaft and having its ends spaced from the arms, cap members secured to the arms and surrounding said ends of the hub and the portions of the shaft between the same and the arms.

5. In combination, a pair of spaced arms for attachment to a plow or the like, a shaft spanning the space between said arms, a hub rotatably mounted on said shaft and having its ends spaced from the arms, annular flanges surrounding said ends of the hub, and a pair of cap members disposed on the shaft between the flanges and the arms and having internal grooves receiving the former.

6. In combination, a pair of spaced arms for attachment to a plow or the like, a shaft spanning the space between the two arms, a hub rotatably mounted on said shaft and having its ends spaced from the arms, cap members secured to the arms and disposed on the shaft between the same and the ends of the hub, the latter being received by said cap members, a tube passed through one of the cap members and into a portion of the shaft therein, a grease cup on the outer end of said tube, and a port leading through the shaft from the inner end of said tube to the hub member.

In testimony whereof I have hereunto set my hand in presence of two subscribing witnesses.

STANLEY P. MILLER.

Witnesses:
H. F. PHELPS,
JESSE D. PHELPS.

Copies of this patent may be obtained for five cents each, by addressing the "Commissioner of Patents Washington, D. C."